United States Patent
Dharmarajan (10) Patent No.: US 7,089,585 B1
(45) Date of Patent: Aug. 8, 2006

(54) METHOD AND SYSTEM FOR AUTHORIZING A CLIENT COMPUTER TO ACCESS A SERVER COMPUTER

(75) Inventor: Baskaran Dharmarajan, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 09/650,105

(22) Filed: Aug. 29, 2000

(51) Int. Cl.
*H04L 9/00* (2006.01)
*G06F 13/14* (2006.01)

(52) U.S. Cl. .............. 726/8; 713/150; 726/2; 726/4; 726/21; 709/201; 709/219; 709/229; 370/401; 370/312; 370/332; 380/286

(58) Field of Classification Search .......... 713/201, 713/100, 150; 714/42; 380/286; 370/401, 370/312, 332; 705/1, 400; 709/219, 229, 709/201; 726/3, 8–10, 2, 21, 4
See application file for complete search history.

(56) References Cited

U.S. PATENT DOCUMENTS

| | | | | |
|---|---|---|---|---|
| 5,455,953 A | * | 10/1995 | Russell | 710/266 |
| 5,481,539 A | * | 1/1996 | Hershey et al. | 370/312 |
| 5,721,777 A | * | 2/1998 | Blaze | 380/286 |
| 5,999,711 A | * | 12/1999 | Misra et al. | 713/201 |
| 6,005,853 A | * | 12/1999 | Wang et al. | 370/332 |
| 6,041,357 A | * | 3/2000 | Kunzelman et al. | 709/228 |
| 6,088,451 A | * | 7/2000 | He et al. | 713/201 |
| 6,101,486 A | * | 8/2000 | Roberts et al. | 705/27 |
| 6,236,971 B1 | * | 5/2001 | Stefik et al. | 705/1 |
| 6,240,512 B1 | * | 5/2001 | Fang et al. | 713/150 |
| 6,263,432 B1 | * | 7/2001 | Sasmazel et al. | 713/100 |
| 6,401,223 B1 | * | 6/2002 | DePenning | 714/42 |
| 6,427,209 B1 | * | 7/2002 | Brezak et al. | 713/201 |
| 6,510,464 B1 | * | 1/2003 | Grantges et al. | 709/225 |
| 6,678,733 B1 | * | 1/2004 | Brown et al. | 709/229 |
| 6,877,095 B1 | * | 4/2005 | Allen | 713/182 |
| 2003/0067926 A1 | * | 4/2003 | Golikeri et al. | 370/401 |

* cited by examiner

*Primary Examiner*—Taghi T. Arani
(74) *Attorney, Agent, or Firm*—Christensen O'Connor Johnson Kindness PLLC (57) ABSTRACT

The present invention includes a client computer, a first server computer, and a second server computer. The first server provides an authorization ticket containing a time stamp to the client computer when the client computer is authorized to access the first server. An elapsed time counter is started at the client computer when access is provided to the first server. When a request is received at the client computer to access the second server, the client computer determines the session length based upon the elapsed time counter. The client computer calculates a hash value for the authorization ticket, the session length, and a secret shared with the second server computer. The client computer transmits a login request to the second server including the authorization ticket, the session length, and the hash. The second server decrypts the authorization ticket and retrieves a copy of the shared secret. The second server executes a hash function on the authorization ticket, the session length, and the shared secret. The second server then compares the computed hash to the hash value received from the second client application. If the two hash values are identical, the second server retrieves the time stamp from the authorization ticket and adds the session length to the time stamp. The second server then compares the resulting value to the current time. If the resulting value and the current time are within a preset threshold value, the client computer is provided.

21 Claims, 6 Drawing Sheets

METHOD AND SYSTEM FOR AUTHORIZING A CLIENT COMPUTER TO ACCESS A SERVER COMPUTER

FIELD OF THE INVENTION

This invention generally relates to the field of computer security and, more specifically, relates to a method and system for authorizing a client computer to access a server computer system based upon authorization previously provided to access another server computer system.

BACKGROUND OF THE INVENTION

With the advent and explosion of the Internet has come a similar explosion in the number of services available over the Internet. In addition to the popular World Wide Web ("WWW" or "Web"), services are available over the Internet that provide instant messaging, chat facilities, e-mail, and other types of services. To access these services, a user must typically utilize several different client application programs. For instance, a user may utilize an instant messaging client to interface with the instant messaging service and, simultaneously, the user may utilize a Web browser application to retrieve Web-based e-mail or other types of Web pages.

While many client computers are capable of simultaneously executing multiple client application programs to communicate with multiple Internet services, it is not always convenient for a user to use the client application programs in this way. For instance, when a user launches the instant messaging client, the user may be required to provide a username and password. The instant messaging client may then perform a sophisticated and time consuming login procedure to gain access to the server computer that provides the instant messaging service. If the user then desires to access a Web site through a Web browser application program, the user has to launch the Web browser application and then provide the address of the desired Web site. When the Web site responds, the user may then have to again provide their username and password. The user may also have to wait while the Web site and the Web browser application program perform another sophisticated and time consuming login procedure. If the user wants to access additional services, the user will again have to provide a username and password and endure a lengthy login procedure to access these services. Providing a username and password for each client application in this manner can be extremely monotonous for a computer user. Moreover, each time a computer user desires to utilize another client application program, the user may have to wait for a login screen before they can provide their username and password. Waiting for several such login screens to appear may also be monotonous for a computer user.

Therefore, in light of the above, there is a need for a method and system for providing access to a computer system that does not require a user to provide login information if the user has previously been provided access to another computer system. Additionally, there is a need for a method and system for providing access to a computer system based upon previously provided access to another computer system that can authenticate a client computer for access without requiring a user of the client computer to endure a lengthy login procedure.

SUMMARY OF THE INVENTION

The present invention solves the above problems by providing a method and system for providing authorization to access to a second computer system based upon previously provided authorization to access to a first computer system that does not require a user to provide login information more than once. The present invention also solves the above problems by providing a method and system for providing access to a computer system based upon previously provided access to another computer system that can securely authenticate a client computer for access without requiring a user of the client computer to endure a lengthy login procedure.

Generally described, the present invention includes a client computer connected to the Internet that is capable of simultaneously executing multiple client application programs, such as an instant messaging client application and a Web browser application. The present invention also includes a first server computer, such as an instant messaging server computer, that is operative to receive an access request from the client computer. This request may include a username and password. If the client computer is authorized to access the first server computer, the first server computer will transmit an authorization ticket to the client computer. The authorization ticket is encrypted and includes a time stamp indicating the time at which the authentication ticket was created. Once the client computer has been provided authorization to access the first server computer, the client application communicating with the first computer starts an elapsed time counter.

When a request is received at the client computer to access a second server computer, the client application communicating with the first server computer determines the session length based upon the elapsed time counter. The client application then concatenates the original authorization ticket, the session length, and a secret shared with the second server computer, like a user password. A hash function is then applied to the concatenated data to create a unique hash value. The client stores the authorization ticket, the session length, and the hash value in a file that is accessible to a second client application executing on the client computer, such as a Web browser. The client also starts a persistence timer when the file is saved. The persistence timer is periodically checked to determine if a predetermined amount of time has lapsed. If the predetermined amount of time has elapsed, the file is deleted from the client computer.

The client application then launches the second client application and causes a login request to be transmitted from the second client application to the second server computer. The request includes the file containing the authorization ticket, the session length, and the hash. The second client application then receives and displays results received from the second server computer.

When the second server computer receives the login request, the second server computer decrypts the authorization ticket. The second server computer then retrieves the shared secret from its own database containing this information. The second server concatenates the authorization ticket, the session length, and the shared secret and executes a hash function on the concatenated data identical to the hash function utilized by the client computer. The second server then compares the computed hash to the hash value received from the second client application. If the two hash values are not identical, the second server does not authorize the client computer to access the second server and transmits an error message to the second client application.

If the two hash values are identical, the second server retrieves the time stamp from the authorization ticket and adds the session length to the time stamp. The second server then compares the resulting value to the current time. If the resulting value and the current time are not within a preset threshold value, the client computer is not permitted to access the second server and an error message is sent to the second client application. If the resulting value and the current time are within a preset threshold value, the client computer is provided access to the second server computer. The present invention also provides an method, apparatus, and computer-readable medium for providing authorization to access a second computer based on previously provided authorization to access a first computer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to method and system for provided access to a server computer based upon previously provided access to another server computer. Aspects of the present invention may be embodied in a Web server application program, such as the Internet Information Server program owned and licensed by the Microsoft® Corporation of Redmond, Wash. Additionally, aspects of the present invention may be embodied in an instant messaging server application program and an instant messaging client application program, such as those utilized to provide the MSN Messenger service, also provided by Microsoft®.

Referring now to the figures, in which like numerals represent like elements, an actual embodiment of the present invention will be described. Although aspects of the invention will be described in the general context of an application program that executes on an operating system in conjunction with a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. Although the invention is also described as being practiced in distributed computing environment, where tasks are performed by remote processing devices that are linked through a communications network, other possible implementations should be apparent to those skilled in the art.

Figure 1:
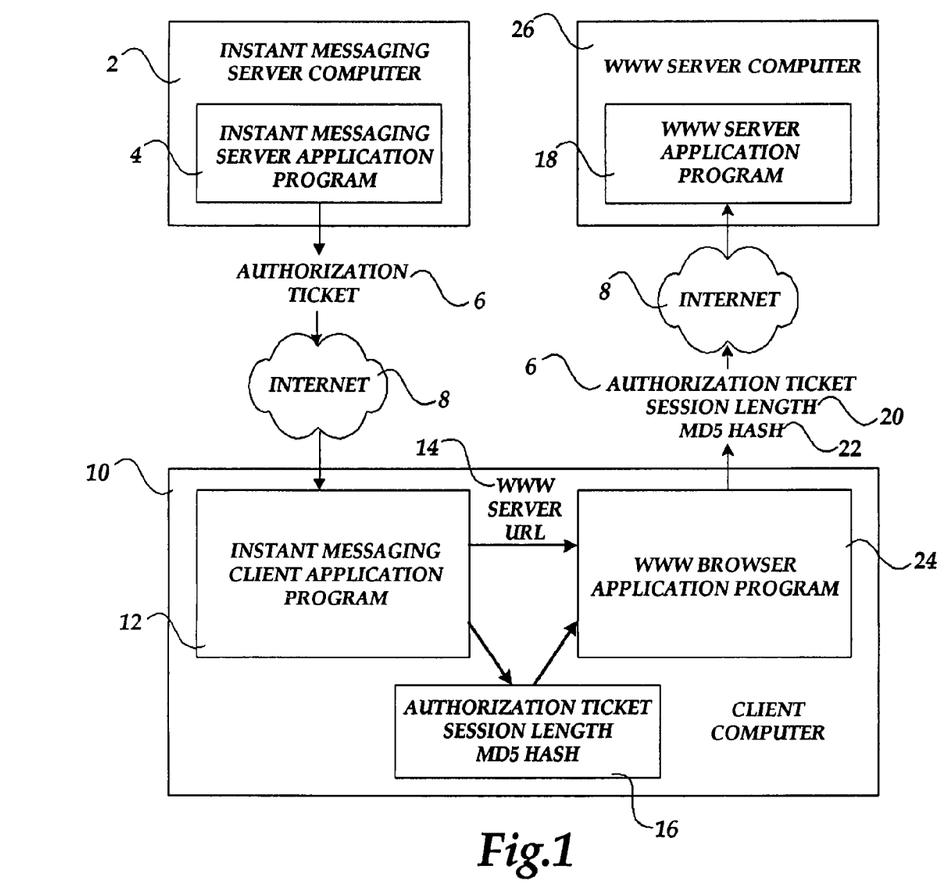
FIG. 1 is a block diagram illustrating a system architecture and general operation for an actual embodiment of the present invention.

Referring now to FIG. 1, aspects of the present invention and an illustrative operating environment for an embodiment of the present invention will be described. According to an embodiment of the present invention, a client computer 10, an instant messaging server computer 2, and a Web server computer 26 are each connected to the Internet 8. An illustrative client computer 10 is described in detail below with reference to FIG. 2. An illustrative Web server computer 26 and an illustrative instant messaging server computer 2 are described below with respect to FIG. 3.

As is well known to those skilled in the art, the Internet 8 comprises a collection of networks and routers that use the Transmission Control Protocol/Internet Protocol ("TCP/IP") to communicate with one another. The Internet typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as the client computer 10, and other related electronic devices can be remotely connected to either the LANs or the WANs via a permanent network connection or via a modem and temporary telephone link. It will be appreciated that the Internet 8 comprises a vast number of such interconnected networks, computers, and routers.

According to an actual embodiment of the present invention, the client computer 10 executes an instant messaging client application program 12. The instant messaging client application program 12 communicates through the Internet 8 with an instant messaging server application 4 executing on the instant messaging server computer 2. Together, the instant messaging client application program 12 and the instant messaging server application program 4 provide instant messaging capabilities to a user of the client computer 10. Instant messaging services allow a user of the client computer 10 to send real-time messages to other users also connected to the instant messaging server computer 2 and are well known to those skilled in the art.

The client computer 10 also executes a Web browser application program 24, such as Internet Explorer provided by Microsoft®. The Web browser application program 24 transmits requests for Web pages or other resources located at the Web server computer 26 to the Web server application program 18. The Web server application program 18 receives the request, determines whether the client computer is authorized to access the Web server computer 26, and responds to the request accordingly. If the client computer 10 is authorized to access the Web server computer 26, the Web server application program 18 will transmit the requested resource to the client computer 10. If the client computer 10 is not authorized to access the requested resource, the Web server application program 18 will transmit an error message to the client computer 10.

According to an embodiment of the present invention, the instant messaging client application program 12 utilizes a sophisticated secure login mechanism to gain access to the instant messaging server application program 4. As part of this procedure, the instant messaging server application program 4 transmits an encrypted authentication ticket 6 to the client computer 10 when authorization is provided to the client computer 10 to access the instant messaging server computer 2. The authentication ticket 6 contains a time stamp indicating the time at which the authentication ticket was created and transmitted to the client computer 10. The authentication ticket 6 is stored by the client computer 10 for subsequent use in accessing the Web server computer 26. Additionally, the client computer 10 begins a session timer that represents the length of time, or session length, the client computer 10 has been authorized to access the instant messaging server computer 2. An illustrative routine for logging the client computer 10 into the instant messaging server computer 2 is described in detail below with reference to FIG. 4.

According to an embodiment of the present invention, a user of the client computer may select a user interface option provided by the instant messaging client application program 12 for gaining quick access to the Web server computer. For instance, a user of the MSN Messenger client application may desire to quickly gain access to their Web-based e-mail account with the HotMail service, also from Microsoft®. In order to provide this functionality, the instant messaging client application program 12 may provide a menu item, button, or other user interface item for quickly accessing the Web server computer 26. In response to the selection of this user interface item, the client computer 10 may gain authorization to access to the Web server computer 26 based upon the previously provided authorization to access the instant messaging server computer 2.

According to an embodiment of the present invention, the client computer 10 gains authorization to access to the Web server computer by first determining the session length of the communications session with the instant messaging server computer 2. The client computer 10 then concatenates the authorization ticket received from the instant messaging server computer 2, the session length, and a shared secret stored at the client computer 10. The shared secret comprises a secret such as a user login, e-mail address or password, that is shared between the client computer and the Web server computer. A hash function is then applied to the concatenated data to determine a unique hash value for the concatenated data. The authorization ticket, session length, and hash value are then stored in a file 16 on the client computer 10 in a location that is accessible to the Web browser application program 24.

The instant messaging client application program 12 causes the Web browser application program 24 to be executed on the client computer and provides a Uniform Resource Locator ("URL") corresponding to the Web server computer 26. The instant messaging client application program 12 also causes the Web browser application program 24 to post the file 16 containing the authorization ticket, session length, and hash value to the Web server application program 18 as a part of a request for authorization to access the Web server computer 26. The client computer 10 then receives a response from the Web server computer 26. If the Web server application program 18 authorizes the client computer 10 to access the Web server computer 26, the Web page located at the requested URL will be returned to the Web browser application program 24. If the Web server application program 18 does not authorize the client computer 10 to access the Web server computer 26, an error message will be returned to the Web browser application program. Additionally, the client computer may delete the file 16 containing the authorization ticket, session length, and hash value after a predetermined amount of time has elapsed to ensure that an unauthorized user does not retrieve this information. An illustrative routine for accessing the Web server computer 26 from the client computer 10 based upon authorization previously provided to access the instant messaging server computer 2 will be described in more detail below with respect to FIG. 5.

According to an embodiment of the invention, the Web server application program 18 receives the authorization ticket, the session length, and the hash value from the client computer 10 as part of a request to access the Web server computer 26. To process the login request, the Web server application program 18 concatenates the authorization ticket, the session length, and a copy of the shared secret stored at the Web server computer. The Web server application program 18 then calculates a hash value for the concatenated data using the same hash function as the one utilized by the client computer 10. The Web server application program 18 then compares the computed hash value to the hash value received from the client computer 10. If the hash values are not identical, the Web server application program 18 does not provide authorization to the client computer 10 to access the Web server computer 26. Rather, the Web server application program 18 transmits an error message to the client computer 10.

If the hash values are identical, the Web server application program 18 performs an additional security check by retrieving the time stamp from the authorization ticket, adding the session length to the time stamp, and comparing the resulting value to the current time. If the sum of the session length and the time stamp are not within a preset range of the current time, the Web server application program 18 transmits an error message to the client computer 10. If the sum of the session length and the time stamp are within a preset range of the current time, the Web server application program 18 authorizes the client computer 10 to access the Web server computer 26 and responds to the request for a resource located at the Web server computer 26. An illustrative routine for processing a request to login to the Web server computer will be described in more detail below with reference to FIG. 6.

Figure 2:
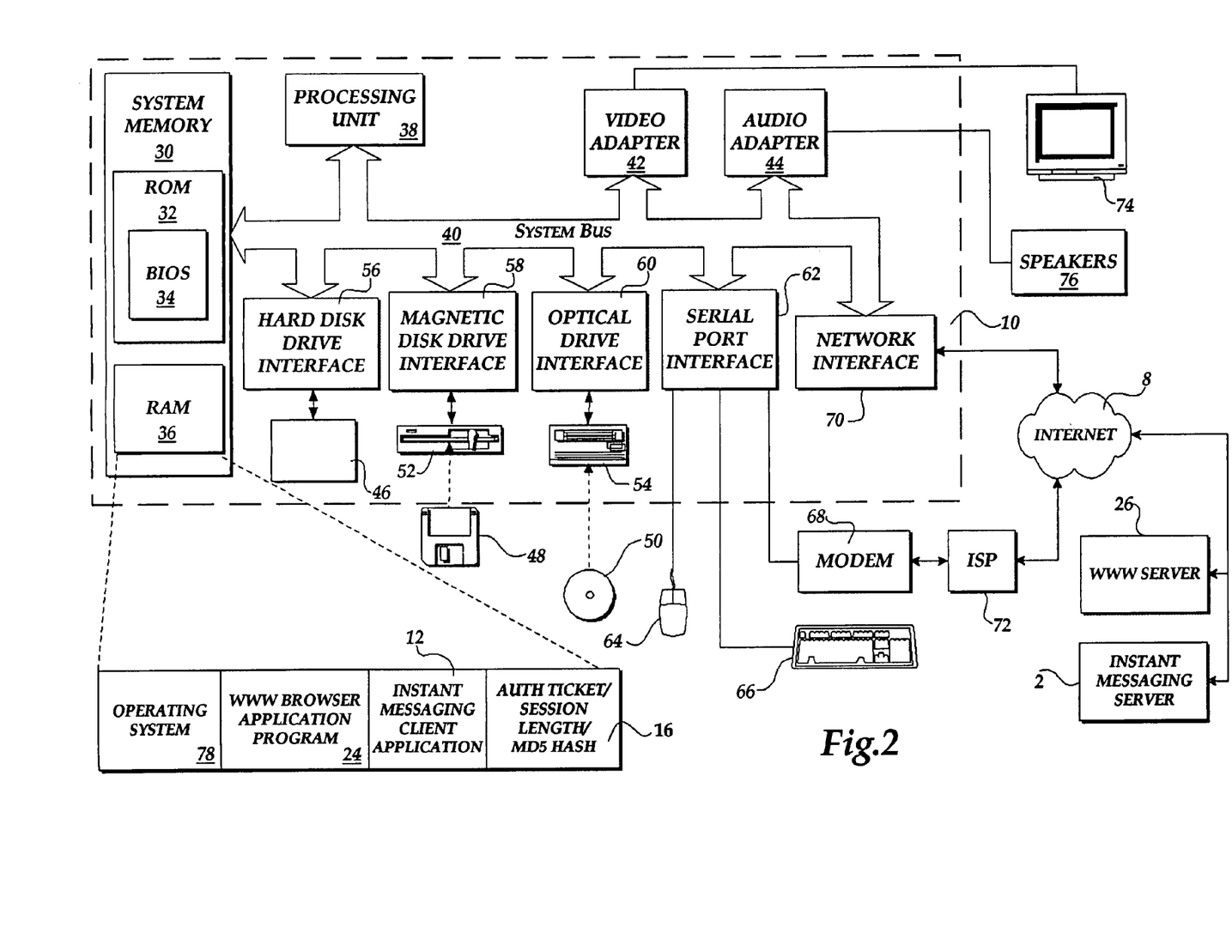
FIG. 2 is a block diagram illustrating a client computer utilized in an actual embodiment of the present invention.

Referring now to FIG. 2, an illustrative client computer 10 will be described. The client computer 10 comprises a conventional personal computer, including a processing unit 38, a system memory 30, and a system bus 40 that couples the system memory 30 to the processing unit 38. The system memory 30 includes a read only memory ("ROM") 32 and a random access memory ("RAM") 36. A basic input/output system 34 ("BIOS"), containing the basic routines that help to transfer information between elements within the client computer 10, such as during start-up, is stored in ROM 32. The client computer 10 further includes a hard disk drive 46, a magnetic disk drive 52, e.g., to read from or write to a removable disk 48, and an optical disk drive 54, e.g., for reading a CD-ROM disk 50 or to read from or write to other optical media such as a Digital Versatile Disk ("DVD"). The hard disk drive 46, magnetic disk drive 52, and optical disk drive 54 are connected to the system bus 40 by a hard disk drive interface 56, a magnetic disk drive interface 58, and an optical drive interface 60, respectively. The drives and their associated computer-readable media provide nonvolatile storage for the client computer 10. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the illustrative operating environment.

A number of program modules may be stored in the drives and RAM 36, including an operating system 78, a Web browser application program 24 and an instant messaging client application 12, such as MSN Messenger from Microsoft®. As described briefly above, the client computer 10 initiates a communications session with a server computer, such as instant messaging server computer 2 using the instant messaging client application 12. When the communications session is initiated, the instant messaging server 2 transmits an authorization ticket to the client computer 10. As will be described in more detail below, the client computer 10 may then utilize the authorization ticket, a session length indicating the length of time the client computer 10 has been authorized to access the instant messaging server 2, and a hash value to receive authorization to access the WWW server 26. The client computer 10 may store the authorization ticket, session length and the hash value in a file 16 that is transmitted to the WWW server 26 as part of the request for authorization. The operation of the client computer 10, the WWW server computer 26, and the instant messaging server 2 in this regard will be described in more detail below with reference to FIGS. 3–6.

A user may enter commands and information into the client computer 10 through input devices such as a keyboard 66 or a mouse 64. Other input devices (not shown) may include a microphone, touchpad, joystick, game pad, satellite dish, scanner, or the like. These and other input devices are often connected to the processing unit 38 through a serial port interface 62 that is coupled to the system bus 40, but may be connected by other interfaces, such as a game port or a universal serial bus (USB). A monitor 74 or other type of display device is also connected to the system bus 40 via an interface, such as a video adapter 42. In addition to the monitor, a client computer 10 may include other peripheral output devices, such as speakers 76 connected through an audio adapter 44 or a printer (not shown).

As described briefly above, the client computer 10 may operate in a networked environment using logical connections to one or more remote computers, such as a WWW server computer 26 and instant messaging server computer 2. According to an embodiment of the invention, the client computer 10 communicates with the WWW server computer 26 and the instant messaging server 2 over the Internet 8. The client computer 10 connects to the Internet 8 through a network interface 70. Alternatively, the client computer 10 may include a modem 68 and use an Internet Service Provider ("ISP") 72 to establish communications over the Internet 8. The modem 68, which may be internal or external, is connected to the system bus 40 via the serial port interface 62. It will be appreciated that the network connections shown are illustrative and other means of establishing a communications link between the client computer 10 and the Internet 8 may be utilized.

Referring now to FIG. 2, an illustrative instant messaging server computer 2 will be described. As described briefly above, a communications session is initiated over the Internet 8 or other distributed computing network between the instant messaging server computer 2 and the client computer 10. When the communications session is initiated, the instant messaging server computer 2 transmits an authorization ticket 6 to the client computer 10. The authorization ticket 6 comprises encrypted data containing a time stamp indicating the time at which the client computer was provided authorization to access the instant messaging server computer. According to an embodiment of the invention, the authorization ticket 6 may be transmitted to the client computer 10 as a persistent state object, or "cookie" as known to those skilled in the art. As described in greater detail below with respect to FIGS. 4–6, the client computer transmits the authorization ticket 6 to a Web server computer as part of a request for authorization to access the Web server computer.

Figure 3:
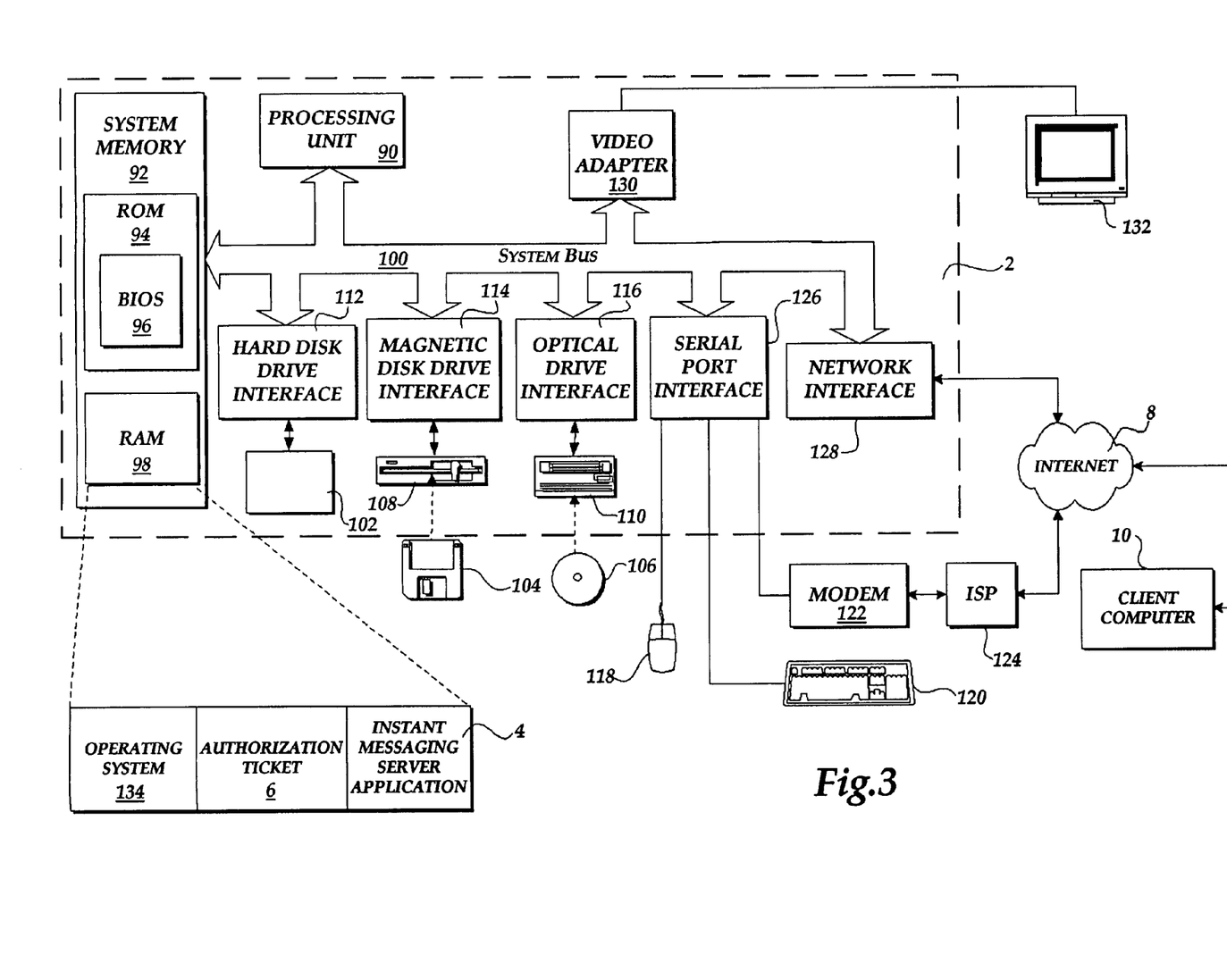
FIG. 3 is a block diagram illustrating a server computer utilized in an actual embodiment of the present invention.

The instant messaging server computer 2 comprises a general purpose server operative to provide instant messaging services to two or more client computers executing instant messaging application software, such as client computer 10. The instant messaging server computer 2 comprises a conventional server computer, including a processing unit 90, a system memory 92, and a system bus 100 that couples the system memory 92 to the processing unit 90. The system memory 92 includes a ROM 94 and a RAM 98. A BIOS 96, containing the basic routines that help to transfer information between elements within the instant messaging server computer 2, such as during start-up, is stored in ROM 94. The instant messaging server computer 2 further includes a hard disk drive 102, a magnetic disk drive 108, e.g., to read from or write to a removable disk 104, and an optical disk drive 110, e.g., for reading a CD-ROM disk 106 or to read from or write to other optical media such as a DVD. The hard disk drive 102, magnetic disk drive 108, and optical disk drive 110 are connected to the system bus 100 by a hard disk drive interface 112, a magnetic disk drive interface 114, and an optical drive interface 116, respectively. The drives and their associated computer-readable media provide nonvolatile storage for the instant messaging server computer 2.

A number of program modules may be stored in the drives and RAM 98, including an operating system 134 suitable for controlling the operation of a server computer, such as Windows NT® or Windows® from Microsoft®. Additionally, an instant messaging server application program 4 may be stored in RAM 98, for providing an instant messaging server like MSN Messenger from Microsoft®. As known to those skilled in the art, the instant messaging server application 4 is operative to receive requests from instant messaging client applications and to respond to those requests by transmitting messages to other available instant messaging clients. As will be described in more detail below, the instant messaging server computer 2 also generates an authentication ticket 6 and transmits the authentication ticket to the client computer 10 when a new instant messaging session is initiated.

A user may control the operation of the instant messaging server computer 2 through input devices such as a keyboard 120 or a mouse 118. These and other input devices are often connected to the processing unit 90 through a serial port interface 126 that is coupled to the system bus 100, but may be connected by other interfaces, such as USB. A monitor 132 or other type of display device is also connected to the system bus 100 via an interface, such as a video adapter 132.

Like the client computer 10, described above with respect to FIG. 3, the instant messaging server computer 2 may operate in a networked environment. According to an embodiment of the invention, the instant messaging server computer 2 communicates with the client computer 10 over the Internet 8. The instant messaging server computer 2 connects to the Internet 8 through a network interface 128. Alternatively, the instant messaging server computer 2 may include a modem 122 and use an ISP 124 to establish a connection to the Internet 8. It will be appreciated that the network connections shown are illustrative and other means of establishing a communications link between the instant messaging server computer 2 and the Internet may be used.

Those skilled in the art should appreciate that while an actual embodiment of the present invention is described utilizing an instant messaging server computer 2 to provide an authorization ticket 6 to the client computer 10, other types of server computers may be utilized. For instance, an Internet Relay Chat ("IRC") server could provide an authentication ticket 6 to the client computer 10 through an IRC client application program. Other types of server computers known to those skilled in the art may also be utilized.

Those skilled in the art should also appreciate that the WWW server computer 26 (shown in FIG. 2), utilizes a computer architecture similar to instant messaging server computer 2. The WWW server computer 26 comprises a general purpose server computer for receiving and responding to HyperText Transfer Protocol ("HTTP") requests. In order to provide this functionality, a Web server application program may be utilized, such as Internet Information Server from Microsoft®. As known to those skilled in the art, the Web server application program is operative to receive HTTP requests through a network interface and to respond to those requests. Typically, an HTTP request will take the form of a request for a page encoded in the Hypertext Markup Language ("HTML"), a graphics file, or another application program stored at the Web server computer 26. As will be described in more detail below, the Web server computer 26 may also receive a file 16 (shown in FIG. 1) containing the authorization ticket 6, a session length, and a hash value from the client computer 10. Using the file 16, the Web server computer 26 can determine whether authorization to access the Web server 26 should be provided to the client computer 10. The operation of the Web server computer 26 will be described in more detail below with reference to FIGS. 5 and 6.

Figure 4:
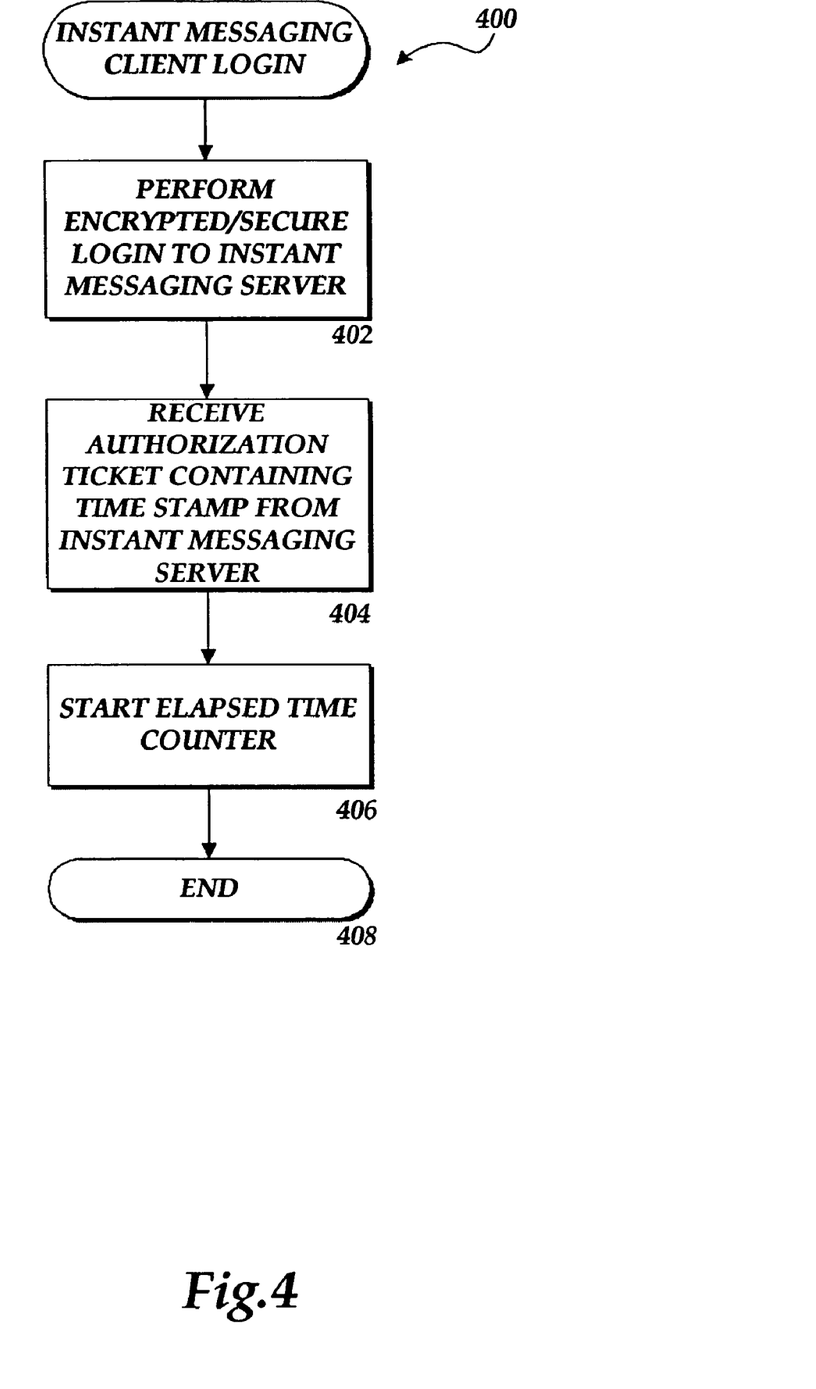
FIG. 4 is a flow diagram illustrating a routine for providing authorization to access a first computer to a client computer according to an actual embodiment of the present invention.

Referring now to FIG. 4, an illustrative Routine 400 will be described for allowing the client computer to access the instant messaging server computer. Routine 400 begins at block 402, where a secure login is performed between the client computer and the instant messaging server computer. The secure login is typically initiated by a user of the instant messaging client application program. The login procedure may include the transmission of a username and password from the client computer to the instant messaging server computer in a secure fashion. For instance, a sophisticated MD5 hashing algorithm may be utilized to encrypt the data. The MD5 algorithm and other suitable secure login mechanisms are known to those skilled in the art.

From block 402, the Routine 400 continues to block 404, where an authorization ticket is transmitted from the instant messaging server computer to the client computer. The authorization ticket is transmitted to the client computer in response to completing the secure login procedure and determining that the client computer is authorized to access the instant messaging server computer. If the client computer is not authorized to access the instant messaging server computer, an authorization ticket will not be transmitted. The authorization ticket contains a time stamp indicating the time at which the authorization ticket was created and transmitted to the client computer. The authorization ticket may also contain additional information utilized by the client computer. The client computer stores the authorization ticket in memory or on a mass storage device for later retrieval.

From block 404, the Routine 400 continues to block 406, where an elapsed time counter is started at the client computer. The elapsed time counter comprises a real-time clock that is started when the authorization ticket is received. Therefore, at any given time, the elapsed time counter indicates the amount of time that has elapsed since the authorization ticket was received from the instant messaging server computer. From block 406, the Routine 400 continues to block 408, where it ends.

Figure 5:
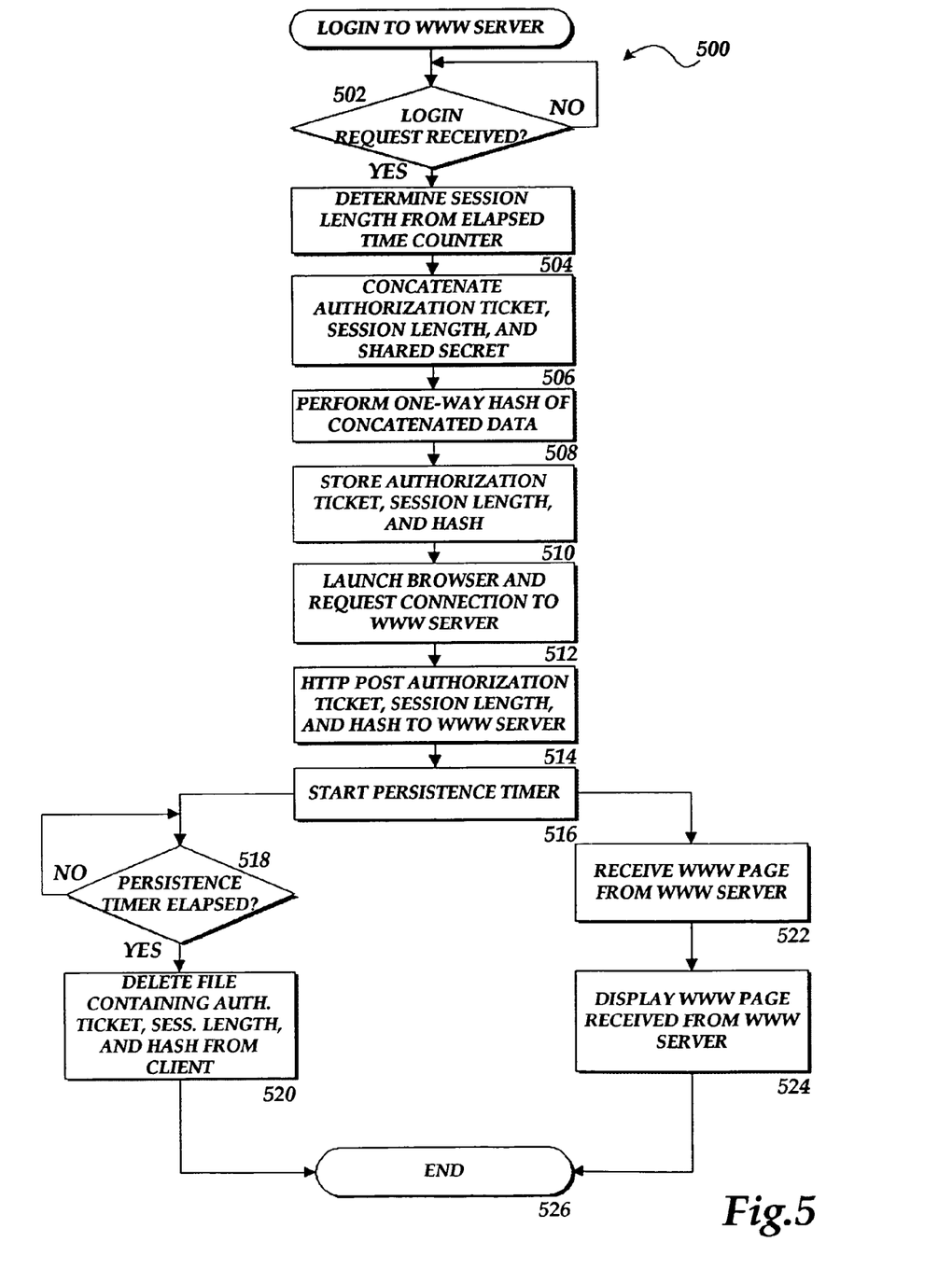
FIG. 5 is a flow diagram illustrating a routine for logging a client computer into a second computer based upon access previously provided to a first computer according to an actual embodiment of the present invention.

Referring now to FIG. 5, an illustrative Routine 500 will be described for accessing the Web server computer from the client computer based upon authorization previously provided to access the instant messaging server computer. Routine 500 begins at block 502, where a determination is made as to whether a request has been received to login to the Web server computer. Typically, such a request is initiated by requesting a resource located at the Web server computer through a Web browser application program. If it is determined that a request has not been received to login to the Web server computer, the Routine 500 returns to block 502, where another determination is made.

If, at block 502, it is determined that a request has been received to login to the Web server computer, the Routine 500 continues to block 504. At block 504, a session length is determined from the elapsed time counter. The session length represents the amount of time the client computer has been authorized to access the instant messaging server computer. As described above with respect to FIG. 4, the elapsed time counter is started when an authorization ticket is received from the instant messaging server computer. The session length is determined by subtracting the time stamp contained in the authorization ticket from the current time.

From block 504, the Routine 500 continues to block 506, where the authorization ticket, the session length, and a shared secret are concatenated to form a concatenated data string. The shared secret comprises data that is shared by both the client computer and the Web server computer. For instance, the shared secret may comprise a user's password, e-mail address, or other similar information. As will be described below with reference to FIG. 6, a copy of the shared secret maintained at the Web server computer is utilized by the Web server computer to authenticate the request for access from the client computer.

From block 506, the Routine 500 continues to block 508, where a hash function is applied to the concatenated data string. A hash function takes a data string as input and provides a unique data string identifying the input string as output. Hash functions are well known to those skilled in the art. When the hash function is applied to the concatenated data string, a hash value is returned that uniquely describes the contents of the concatenated data string. At block 510, the authorization ticket, the session length, and the hash value are stored at the client computer.

From block 510, the Routine 500 continues to block 512, where a Web browser application program is launched on the client computer and a request is made to access the Web server computer. From block 512, the Routine 500 continues to block 514, where the authorization ticket, the session length, and the hash value are transmitted to the Web server computer. According to an embodiment of the invention, the authorization ticket, the session length, and the hash value are transmitted to the Web server computer using an HTTP "POST" command. As known to those skilled in the art, the HTTP POST command sends data in a message body that follows a request header, as opposed to transmitting the data in a URL. The message body is generally encoded in the same manner as when appended to a URL. Other methods for transmitting this information to the Web server computer will be apparent to those skilled in the art.

From block 514, the Routine 500 continues to block 516, where a persistence timer is started at the client computer. The persistence timer utilizes a real-time clock to determine the length of time since the HTTP POST request was transmitted to the Web server computer. From block 516, the Routine 500 branches to blocks 518, and 522 in parallel. Accordingly, the operations performed at blocks 518 and 520, and blocks 522 and 524 may be performed simultaneously.

At block 518, a determination is made as to whether the persistence timer has elapsed. This determination may be made by comparing the persistence timer to a predefined value. If the persistence timer has not elapsed, the Routine 500 returns to block 518, where another check is made to determine if the persistence timer has elapsed. If, at block 518, it is determined that the persistence timer has elapsed, the Routine 500 continues to block 520. At block 520, the authorization ticket, session length, and hash value are deleted from the client computer. By deleting this information from the client computer after a predetermined amount of time has elapsed, the chances that an unauthorized recipient may retrieve the information are greatly reduced. The method 500 then continues from block 520 to block 526, where it ends.

From block 516, the Routine 500 also continues to block 522, where a response is received from the Web server computer. The response may take the form of a Web page transmitted from the Web server computer to the client computer. The Routine 500 then continues from block 522 to block 524, where the Web page received from the Web server computer is displayed at the client computer utilizing the Web browser application program. The Web page may comprise an error message if the Web server computer was unable to provide authorization to the client computer to access the Web server computer. Likewise, the Web page may comprise the network resource requested by the client computer if the Web server computer was able to authorize the client computer to access the Web server computer. An illustrative routine for processing a request for access at the Web server computer is described below with respect to FIG. 6. The Routine 500 continues from block 524 to block 526, where it ends.

Figure 6:
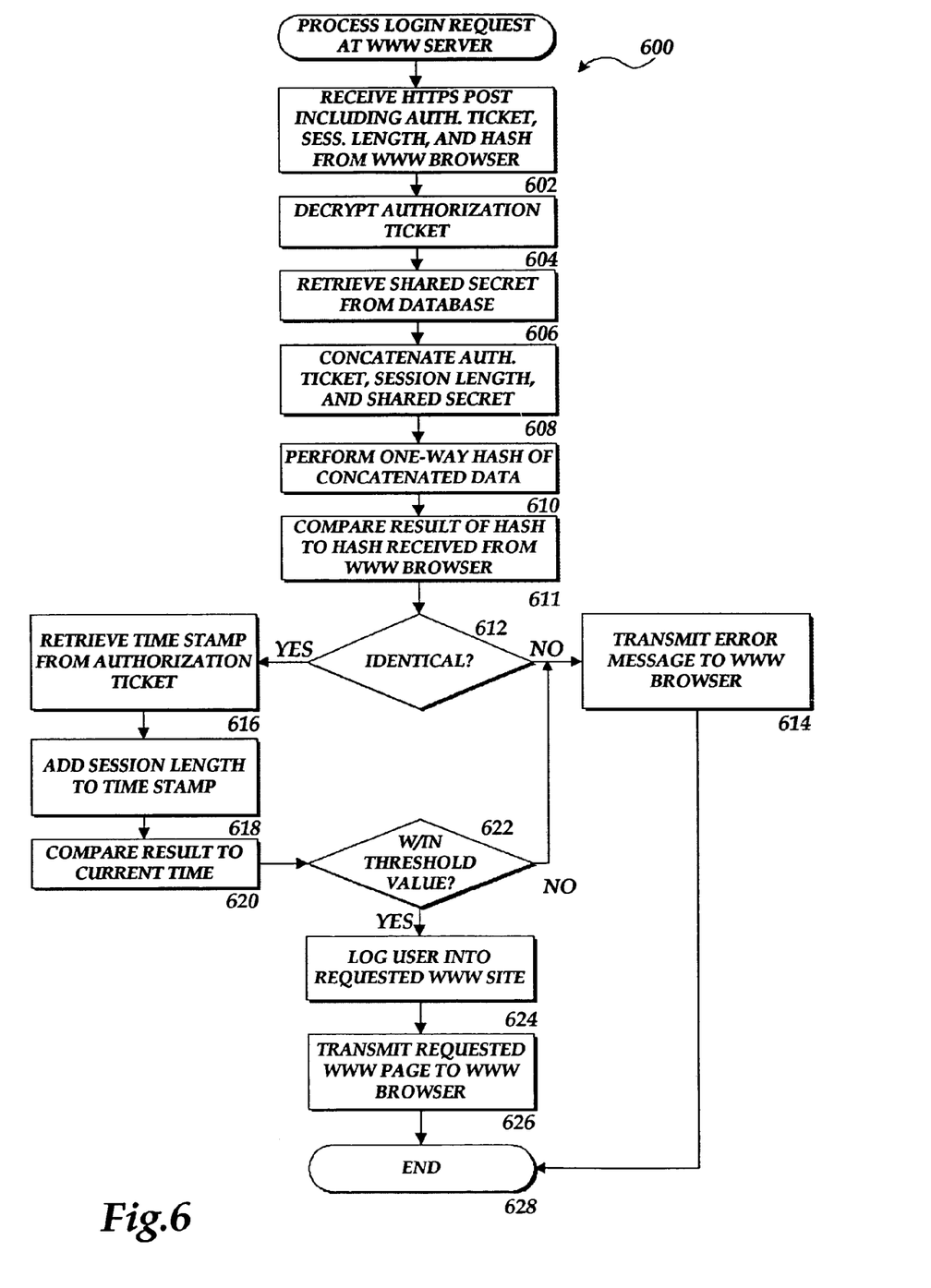
FIG. 6 is a flow diagram illustrating a routine for authorizing a client computer to access a second computer based upon access previously provided to the client computer to access a first computer according to an actual embodiment of the present invention.

Referring now to FIG. 6, an illustrative Routine 600 for processing a request to login to the Web server computer will be described. The Routine 600 begins at block 602, where the HTTP POST, including the authorization ticket, session length, and hash value, is received from the client computer as part of the request to access the Web server computer. The Routine 600 continues from block 602 to block 604, where the Web server computer decrypts the authorization ticket and retrieves the time stamp contained therein. In order to decrypt the authorization ticket, the Web server computer maintains a decryption key that can be used to decrypt data encrypted by the instant messaging server computer.

From block 604, the Routine 600 continues to block 606, where the Web server retrieves a copy of the shared secret stored at the Web server computer. As described above with respect to FIG. 5, the Web server computer maintains a copy of a shared secret, such as the user's password, login, or e-mail address, to use in computing a hash value. From block 606, the Routine 600 continues to block 608, where the authorization ticket received from the client computer, the session length received from the client computer, and the copy of the shared secret maintained at the Web server computer are concatenated. The Routine 600 then continues to block 610, where a hash function identical to the one utilized by the client computer is applied to the concatenated data. As described above with respect to FIG. 5, a hash function takes a data string as input and provides a unique data string identifying the input string as output. When the hash function is applied to the concatenated data, a hash value is returned that uniquely describes the contents of the concatenated data string.

From block 610, the Routine 600 continues to block 611, where the hash value calculated at the Web server computer is compared to the hash value received from the client computer as a part of the login request. The two hash values are compared to determine if they are identical. From block 611, the Routine 600 continues to block 612, where the Web server computer determines whether the two hash values are identical. If the Web server computer determines that the hash values are not identical, the Routine 600 branches to block 614, where an error message is transmitted to the client computer. Additionally, the client computer is denied access to the Web server computer. The Routine 600 then continues from block 614 to block 628, where it ends.

If, at block 612, the Web server computer determines that the two hash values are identical, the Routine 600 branches to block 616. At block 616, the Web server computer retrieves the time stamp included in the authorization ticket transmitted by the client computer as part of the login request. The Routine 600 then continues to block 618, where the time stamp is added to the session length also provided by the client computer as part of the login request. From block 618, the Routine 600 continues to block 620, where the sum of the time stamp and the session length is compared to the current time to determine if the sum is within a preset threshold value of the current time. From block 620, the Routine continues to block 622, where the Web server computer determines whether the sum is within the preset threshold value. If the Web server computer determines that the sum is not within the preset threshold value, the Routine 600 branches to block 614, where an error message is transmitted to the client computer. Additionally, the client computer is denied access to the Web server computer.

If, at block 622, the Web server computer determines that the sum is within the preset threshold value, the Routine 600 continues to block 624, where the Web server authorizes the client computer to access the Web server computer. The Routine 600 then continues from block 624 to block 626, where the Web page requested by the client computer is retrieved and transmitted to the Web browser application program executing on the client computer. The Routine 600 then continues to block 628, where it ends.

In light of the above, it should be appreciated that the present invention provides a method, system, computer-controlled apparatus, and computer-readable medium for authorizing a client computer to access a second computer based upon previously provided authorization to access a first computer. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for authorizing a second client-based application on a client computer to access a service provided by a second server-based application based upon a previously provided authorization that authorized the client computer to use a first client-based application to access a service provided by the first server-based application comprising:
- (a) receiving a request for authorizing the client computer to use said second client-based application to access the service provided by said second server-based application;
- (b) wherein the service provided by said second server-based application is different than the service provided by said first server-based application;
- (c) wherein the request for authorizing the client computer to use said second client-based application to access the service provided by said second server-based application originates from said first client-based application;
- (d) in response to said request:
  - (i) determining a session length indicating a length of time said client computer has been authorized to access the service provided by said first server-based application;
  - (ii) calculating a hash value for an authorization ticket received from said first server-based application, said session length, and a secret shared between said client computer and said second server-based application, and
  - (iii) transmitting a request for authorization to access the service provided by said second server-based application comprising said hash value, said authorization ticket, and said session length.

2. The method of claim 1, wherein said authorization ticket comprises a time stamp, and wherein determining a session length comprises subtracting said time stamp from an elapsed time counter to determine said session length.

3. The method of claim 2, wherein said elapsed time counter is started when said authorization ticket is received from said first server-based application.

4. The method of claim 3, wherein said authorization ticket is received from said first server-based application when said client computer is authorized to access the service provided by said first server-based application.

5. The method of claim 1, wherein calculating a hash value comprises performing an MD5 hash of an authorization ticket received from said first server-based application, said session length, and a secret shared between said client computer and said second server-based application.

6. The method of claim 1, further comprising:
- starting a persistence timer when said first server-based application ceases providing a service to said client computer;
- determining whether said persistence timer has reached a predefined value prior to receiving a response from said second server-based application; and
- in response to determining that said persistence timer has reached a predefined value prior to receiving a response from said second server-based application, deleting said authorization ticket, said session length and said hash value from said client computer.

7. The method of claim 6, further comprising:
- in response to determining that said persistence timer has not reached a predefined value prior to receiving a response from said second server-based application, receiving said response from said second server-based application and displaying said response at said client computer.

8. The method of claim 1, wherein said first server-based application is an instant messaging application that provides a different service than said second server-based application which is a Web application.

9. A computer-controlled apparatus operative to perform the method of claim 1.

10. A computer-controlled apparatus operative to perform the method of claim 2.

11. A computer-readable medium containing computer-readable instructions which, when executed by a computer, perform the method of claim 1.

12. A computer-readable medium containing computer-readable instructions which, when executed by a computer, perform the method of claim 2.

13. A computer-implemented method for authorizing a second client-based application on a client computer to access a service provided by a second server-based application based upon a previously provided authorization that authorized the client computer to use a first client-based application to access a service provided by the first server-based application, comprising:
- (a) receiving a request for authorizing the client computer to use said second client-based application to access the service provided by said second server-based application from said client computer comprising a hash value, an authorization ticket, and a session length;
- (b) wherein the service provided by said second server-based application is different than the service provided by said first server-based application;
- (c) computing a new hash value for said authorization ticket, said session length, and a copy of a secret shared between said client computer and said second server-based application;
- (d) determining whether said hash value received from said client computer is identical to said new hash value; and
- (e) in response to determining that said hash value received from said client computer is identical to said new hash value, authorizing said client computer to use said second client-based application to access the service provided by said second server-based application.

14. The method of claim 13, further comprising:
- (e) in response to determining that said hash value received from said client computer is identical to said new hash value;
  - (i) determining whether a sum of said session length and a time stamp received as part of said authorization ticket is within a preset threshold value of a current time; and
  - (ii) in response to determining that the sum of said session length and said time stamp is within said preset threshold value, authorizing said client computer to access the service provided by said second server-based application.

15. The method of claim 14, further comprising:
- (f) in response to determining that said hash value received from said client computer is not identical to said new hash value, not authorizing said client computer to access the service provided by said second server-based application.

16. The method of claim 15, further comprising:
- (g) in response to determining that the sum of said session length and said time stamp is not within said preset threshold value, not authorizing said client computer to access the service provided by said second server-based application.

17. A computer-controlled apparatus operative to perform the method of claim 13.

18. A computer-controlled apparatus operative to perform the method of claim 14.

19. A computer-readable medium containing computer-readable instructions which, when executed by a computer, perform the method of claim 13.

20. A computer-readable medium containing computer-readable instructions which, when executed by a computer, perform the method of claim 14.

21. The method of claim 13, wherein said first server-based application is an instant messaging application that provides a different service than said second server-based application which is a Web server application.

* * * * *